United States Patent [19]
Ichikawa

[11] Patent Number: 4,569,137
[45] Date of Patent: Feb. 11, 1986

[54] LINEAR SCALE TYPE DISPLACEMENT MEASURING DEVICE AND MAIN SCALE ATTACHING METHOD THEREOF

[75] Inventor: Souji Ichikawa, Sagamihara, Japan

[73] Assignee: Mitutoyo Mfg. Co., Ltd., Tokyo, Japan

[21] Appl. No.: 616,181

[22] Filed: Jun. 1, 1984

[30] Foreign Application Priority Data

Jun. 7, 1983 [JP] Japan ................................ 58-101447
Jun. 7, 1983 [JP] Japan ................................ 58-101448

[51] Int. Cl.⁴ ............................................ G01B 11/04
[52] U.S. Cl. ................................ 33/125 R; 33/125 C
[58] Field of Search ............ 33/125 R, 125 A, 125 T, 33/125 C, DIG. 19, DIG. 3; 250/237 G

[56] References Cited

U.S. PATENT DOCUMENTS 4,136,958 1/1979 Nelle ................................ 33/125 C
4,414,746 11/1983 Takizawa ......................... 33/125 C Primary Examiner—Harry N. Haroian
Attorney, Agent, or Firm—Parkhurst & Oliff

[57] ABSTRACT

This disclosure depicts a linear scale type displacement measuring device wherein the measuring device comprises a frame member connected to one of two bodies to be measured, a main scale held on the frame member and an index scale connected to the other of the two bodies, and a relative displacement between the two bodies is measured from a relative movement between the main scale and the index scale. A main scale holding member having two guide surfaces corresponding to two surfaces intersecting each other of the main scale is bondedly fixed at a predetermined pitch to the frame member in its longitudinal direction, and the main scale is bondedly fixed to the main scale holding member in a state of being urged against the guide surfaces of the main scale holding member by urging means utilizing a main scale engaging portion separately provided or formed on the main scale holding member itself. With this arrangement, irrespective of a bend and the like of the frame member, the main scale is held straightly and a difference in value of thermal expansion between the main scale and the frame member can be absorbed.

10 Claims, 8 Drawing Figures

LINEAR SCALE TYPE DISPLACEMENT MEASURING DEVICE AND MAIN SCALE ATTACHING METHOD THEREOF

BACKGROUND OF THE INVENTION

1. Field of the Invention

This invention relates to linear scale type displacement measuring devices, and more particularly, to improvements in a linear scale type displacement measuring device suitable for use in a linear scale type displacement measuring device provided with a comparatively short main scale, wherein the measuring device comprises a frame member connected to one of two bodies to be measured, between which a relative displacement is to be measured, a main scale held on the frame member and formed of a material different in coefficient of thermal expansion from the frame member and an index scale connected to the other of the two bodies and movable along the main scale, whereby a relative displacement between the two bodies is measured from a relative movement between the main scale and the index scale.

2. Description of the Prior Art

In general, there has heretofore been known a displacement measuring device for measuring length and the like of bodies, wherein, when a movement value between two bodies relatively movable to each other, such as a movement value of a measuring element relative to the main body of measuring device, a movement value of a slider relative to a column and the like, is to be measured, a frame member holding a main scale is provided on one hand and a detector including an index scale is affixed on the other hand, whereby a relative movement between the frame member and the detector is read by an optical method or an electromagnetic method, for example.

The above-described displacement measuring device, particularly, the linear scale type displacement measuring device provided with a transmission type displacement detector has been disadvantageous in that, since the frame member complicated in its configuration is formed of an aluminum extruded section in order to attain sealing property, non-combustibility, light weight and the like of the detecting portion, and the main scale held on the frame is made of glass, the frame member and the main scale are varied in value of thermal expansion from each other, when temperature is varied, and the main scale is deformed to cause lowered measuring accuracy, or the main scale is broken down in an extreme case.

In consequence, as shown in FIG. 1 for example, such a practice has heretofore been adopted that a main scale 10 is directly bondedly fixed to a frame member 14 by use of an elastic bonding agent 16 or the like in a state where two surfaces perpendicularly intersecting each other of the main scale 10 are urged against guide surfaces 14A and 14B of the frame member 14 by a rubber rods 12, to thereby elastically holding the main scale 10.

In FIG. 1, designated at 20 is a slider movable in the longitudinal direction of the main scale 10 in a manner to hold a predetermined positional relationship with the main scale 10 through the agency of slidable blocks 22 slidable on the surfaces of the main scale 10, 24 an index scale provided with vertical fringe graduations similar to those of the main scale 10 and affixed to a surface of the slider 20, which is opposed to a graduated surface 10A of the main scale 10, and 26 and 28 a light emitting element and a light receiving element both being affixed to the slider 20 in a state of interposing therebetween the main scale 10 and the index scale 24.

However, owing the manufacturing method, in an alumunum extruded section forming the frame member 14, there are irregularly generated a bend or bends, torsion, undulation and the like of length of about 0.03 mm to 300 mm for example, i.e. about 30 times of the graduation resolving-power of 1 micrometer for example. It is practically impossible to correct it and finish it with high accuracy as high as the main scale 10. Furthermore, in the use conditions, thermal deformations tend to occur depending on a change in temperature. In consequence, heretofore, there have been such problems that, even if the main scale 10 is finished at very high accuracy in order to attain a graduation resolving-power of about 1 micrometer for example, the main scale 10 is deformed, following a bend and the like of the frame member 14, when the main scale 10 is being bondedly fixed to the frame member 14, whereby the graduations are enlarged or contracted, thus resulting in considerably lowered measuring accuracy.

Now, when presumption is made on the effect of a bend of the main scale 10 on the measuring accuracy in the case where the main scale 10 is bent under the influence of the bend of the frame member 14, if graduations 10B are formed symmetrically with a neutral shaft A of the main scale 10 as shown in FIG. 2, then, when the bend on the main scale 10 is generated in the dirction of its height as indicated by arrows B, no error will be generated. However, since the graduated surface 10A where graduations 10B are formed normally does not conform to a neutral surface C of the main scale 10, when the bend on the main scale is generated in the direction of thickness of the main scale 10 as shown in FIG. 3, an error $\epsilon$ therebetween will be approximately represented by the follwing equation, if a radius of the bend is R, a virtual angle of a unit section, by which the error is evaluated, is $\Delta\theta$, the length obtained before the bend is generated, i.e. the length of the neutral surface C is L, and the length of the graduated surface 10A is Lo.

$$\epsilon = Lo - L \qquad (1)$$

$$Lo \div (R + t/2) \qquad (2)$$

$$L \div R\Delta\theta \qquad (3)$$

where t is the thickness of the main scale 10.

Now, a value of the largest deformation $\delta$ will be approximately represented by the following equation.

$$\begin{aligned}
\delta &= R - R\cos(\Delta\theta/2) \\
&\approx R[1 - \{1 - (1/2!) \times (\Delta\theta/2)^2\}] \\
&= R(\Delta\theta)^2/8 \\
&= L\Delta\theta/8
\end{aligned} \qquad (4)$$

In consequence, the aforesaid error $\epsilon$ will be given by the following equation by use of this $\delta$.

$$\begin{aligned}
\epsilon &\approx (t/2)\Delta\theta \\
&\approx (t/2) \times (8\delta/L) \\
&\approx 4t\,\delta/L
\end{aligned} \qquad (5)$$

In consequence, when the length L of the error evaluating unit section of the main scale 10 is 300 mm, the thickness t is 5 mm and the largest deformation $\delta$ is 0.06 mm, the error $\epsilon$ becomes about 4 micrometers. Hence, in the case of a main scale having the total length of 900 mm, an error of 12 micrometers is generated, which will lead to a fatal defect with the linear scale type displacement measuring device, of which a measuring accuracy of 1 micrometer or less is required.

To obviate the above-described problem, it is conceivable that, in bondedly fixing the main scale 10 to the frame member 14, a test indicator, electric micrometer and the like is used, the electric micrometer or the like is brought into contact with the two surfaces of the main scale 10 for example, the accuracy is measured in the longitudinal direction, and a shim or shims are inserted between the main scale 10 and the frame member 14 in accordance with the irregularities formed on the main scale 10, whereby the positioning of the main scale 10 is carried out. However, this is disadvantageous in that the operation is very low in the efficiency, and moreover, it is considerably difficult in accurate positioning of the main scale 10.

SUMMARY OF THE INVENTION

The present invention has been developed to obviate the above-described disadvantages of the prior art and has as its first object the provision of a linear scale type displacement measuring device wherein, irrespective of a bend and the like of the frame member, the main scale can be held straightly, and a difference in the value of thermal expansion between the main scale and the frame member can be absorbed, so that a measurement with high accuracy can be carried out.

The present invention has as its second object the provision of a linear scale type displacement measuring device, wherein, even if the form accuracy of the member for holding the main scale is not high, the main scale can be stably held at its neutral surface.

The present invention has as its third object the provision of a linear scale type displacement measuring device, wherein, an unbalanced moment is prevented from generating between the main scale and urging means.

The present invention has as its fourth object the provision of a linear scale type displacement measuring device, wherein, the main scale of comparatively short length is prevented from being damaged due to thermal stress, a hysteresis in a measured value due to a change in temperature during the measurement is reduced, and further, a trouble such as a shift in position of the main scale due to the careless handling during transportation can be prevented from occurring.

The present invention has as its fifth object the provision of a linear scale type displacement measuring device, wherein, the main scale of comparatively long length is prevented from being damaged due to thermal stress, and a hysteresis in a measured value due to a change in temperature during the measurement is reduced.

The present invention has as its sixth object the provision of a linear scale type displacement measuring device, wherein, there is enhanced an effect of absorbing a difference in the value of thermal expansion between the main scale and the frame member.

The present invention has as its seventh object the provision of a linear scale type displacement measuring device, wherein, the frame member is not utilized as a reference for positioning at all, consequently, irrespective of the bend and the like of the frame member, the main scale is held straightly, a difference in the value of thermal expansion between the frame member and the main scale can be absorbed, and accordingly, the measurement can be carried out with high accuracy.

The present invention has as its eighth object the provision of a linear scale type displacement measuring device, wherein, the main scale is firmly held.

The present invention has as its ninth object the provision of a linear scale type displacement measuring device simplified in construction.

The present invention has as its tenth object the provision of a linear scale type displacement measuring device wherein a main scale holding member is easily bondedly fixed to the frame member in a state where the straightness of guide surfaces is maintained.

To achieve the first object, the present invention contemplates that, in a linear scale type displacement measuring device wherein said measuring device comprises a frame member connected to one of two bodies, a relative displacement between which is to be measured, a main scale held on the frame member and formed of a material different in coefficient of thermal expansion from the frame member and an index scale connected to the other of the two bodies and movable along the main scale, and a relative displacement between the two bodies is to be measured from a relative movement between the main scale and the index scale, a main scale holding member having two guide surfaces corresponding to two surfaces intersecting each other of the main scale is bondedly fixed at a predetermined pitch to the frame member in its longitudinal direction in a state where the straightness of the guide surfaces are maintained, and the main scale is bondedly fixed to the scale holding member in a state of being urged against the guide surfaces of the main scale holding member by urging means.

To achieve the second object, the present invention contemplates that a guide ridge is formed at the central portion in the direction of the main scale of the guide surface.

To achieve the third object, the present invention contemplates that the urging means is formed of an elastic material and an area of the elastic material in contact with the main scale is smaller than an area of the main scale in contact with the main scale holding member.

To achieve the fourth object, the present invention contemplates that a ratio between the length of the guide surface of the main scale holding member and the interval of providing the main scale holding member is set within the range from 1:7 to 1:11.

To achieve the fifth object, the present invention contemplates that a ratio between the length of the guide surface of the main scale holding member and the interval of providing the main scale holding member is set within the range from 1:15 to 1:20.

To achieve the sixth object, the present invention contemplates that an elastic bonding agent is used at least in one of the bonded fixations between the main scale holding member and the frame member and between the main scale and the main scale holding member.

To achieve the seventh object, the present invention contemplates that, in a linear scale type displacement measuring device wherein said measuring device comprises a frame member connected to one of two bodies, a relative displacement between which is to be measured, a main scale held on the frame member and formed of a material different in coefficient of thermal expansion from the frame member and an index scale connected to the other of the two bodies and movable along the mian scale, and a relative displacement between the two bodies is to be measured from a relative movement between the main scale and the index scale, a main scale holding member having two guide surfaces corresponding to two surfaces intersecting each other of the main scale is bondedly fixed at a predetermined pitch to the frame member in its longitudinal direction in a state where the straightness of the guide surfaces are maintained, and the main scale is bondedly fixed to the main scale holding member in a state of being urged against the guide surfaces of the main scale holding member by urging means utilizing the main scale engaging portion.

To achieve the eighth object, the present invention contemplates that the urging means comprises rubber rods inserted between the main scale engaging portion of the main scale holding member and the main scale.

To achieve the ninth object, the present invention contemplates that, the urging means is the main scale engaging portion itself provided with a spring characteristics in the main scale holding member.

To achieve the tenth object, the present invention contemplates that a method of mounting the main scale onto the above-described linear scale type displacement measuring device comprising:

- a step of attractingly fixing the main scale holding member formed of a magnetic material at a predetermined pitch to a positioning jig including magnet portions of shapes corresponding to the two surfaces intersecting each other of the main scale, the magnet portions are provided at least at positions corresponding to the positions, where the main scale holding member having two guide surfaces corresponding to two surfaces intersecting each other of the main scale are provided;
- a step of bondedly fixing the frame member to the main scale holding member attractedly fixed to the positioning jig; and
- a step of removing the positioning jig, and instead, bondedly fixing the main scale to the main scale holding member.

According to the present invention, the main scale is bondedly fixed to the main scale holding member having two guide surfaces corresponding to two surfaces intersecting each other of the main scale and bondedly fixed to the frame member in a state where the straightness of the guide surfaces is maintained, or the main scale is held without using the frame member as a reference for positioning at all, so that, irrespective of a bend and the like of the frame member, the main scale can be held straightly. Furthermore, the main scale holding member is bondedly fixed at a predetermined pitch to the frame member in its longitudinal dirction, so that a difference in value of thermal expansion between the main scale and the frame member can be easily absorbed. In consequence, a high measuring accuracy can be attained.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiments of the present invention with reference to the drawings.

Figure 1:
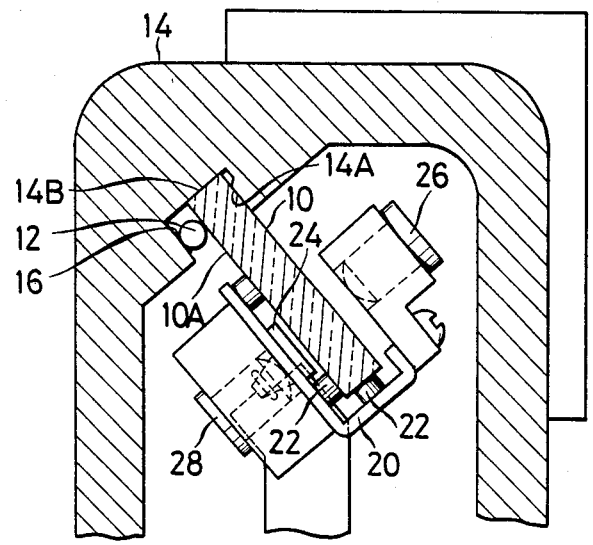
FIG. 1 is a sectional view showing construction for holding the main scale in an example of the conventional linear scale type displacement measuring device.
Figure 2:
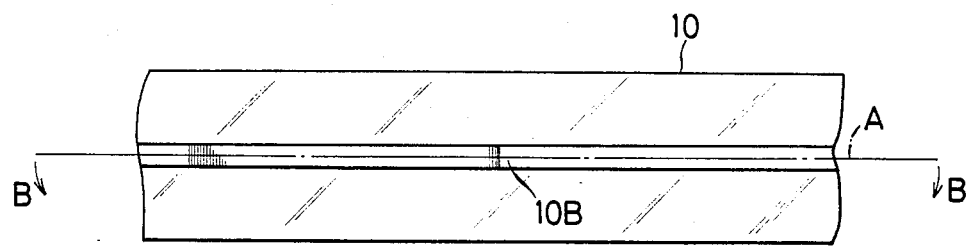
FIG. 2 is a front view showing an example of the relationship between the position where graduation are formed and the direction of a bend in the main scale.
Figure 3:
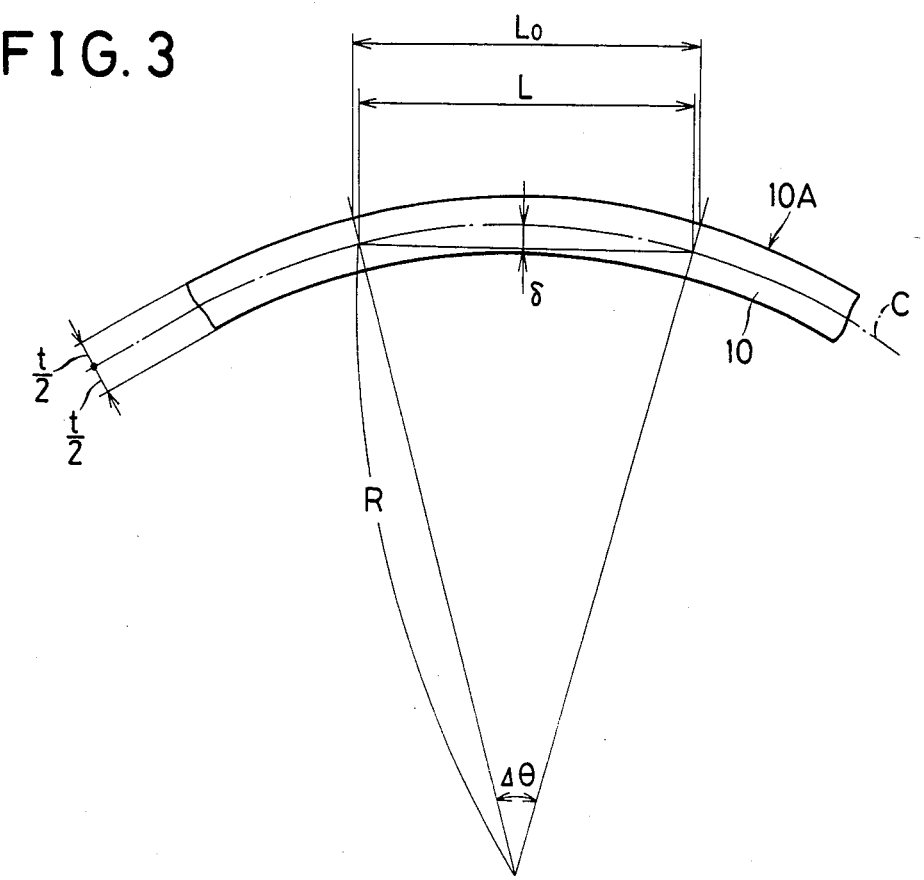
FIG. 3 is a plan view for calculting a measuring error generated by the bend in the direction of the thickness of the main scale.
Figure 4:
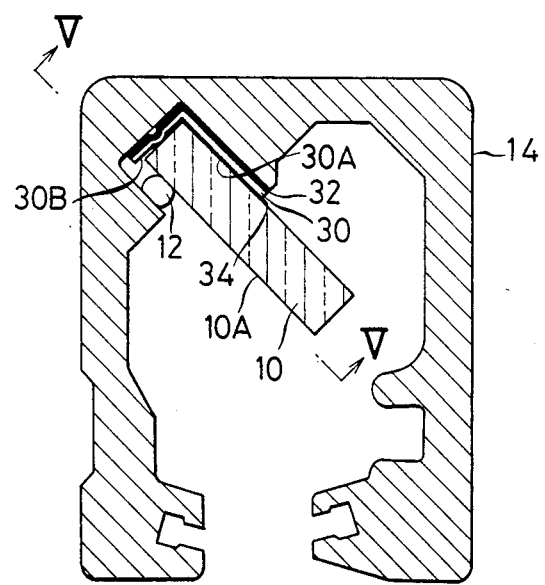
FIG. 4 is a secional view showing construction for holding the main scale in a first embodiment of the linear scale type displacement measuring device according to the present invention.
Figure 5:
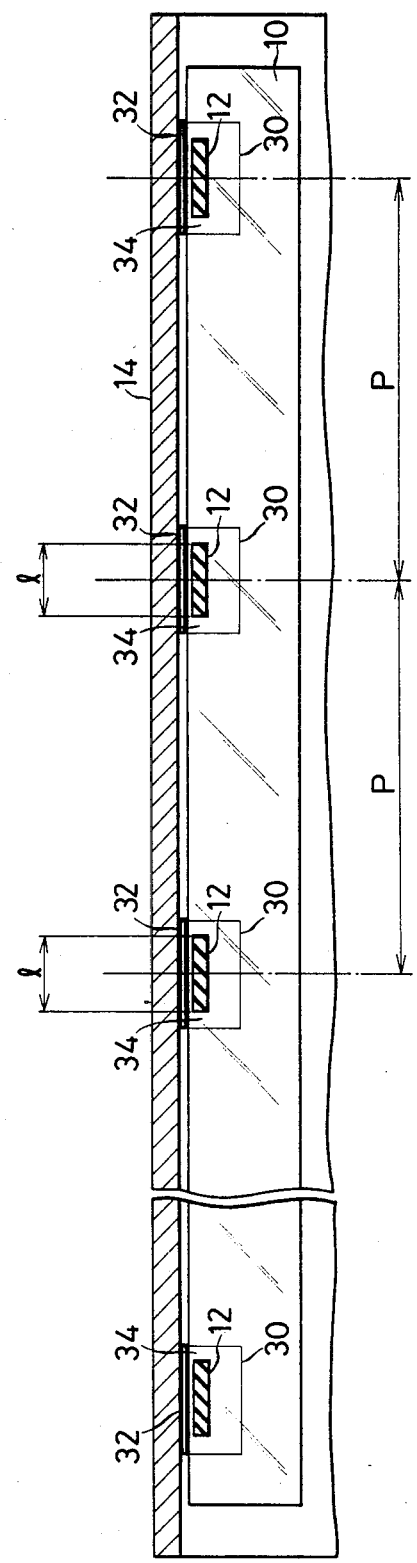
FIG. 5 is a sectional view taken along the line V—V in FIG. 4.

As shown in FIGS. 4 and 5, according to the first embodiment of the present invention, in a linear scale type displacement measuring device, wherein the measuring device comprises: a frame member 14 formed of an aluminum extruded section, for example, fixed to one of two bodies to be measured, a relative displacement of which is to be measured, e.g. a bed of a machine tool; a main scale 10 held by the frame member 14 and formed of a material different in coefficient of thermal expansion from the frame member 14, e.g. glass; and an index scale, not shown, connected to the other of the two bodies to be measured, e.g. a workpiece to be finished or a tool and movable along the main scale 10; and a relative displacement between the two bodies is measured from a relative movement between the main scale 10 and the index scale, a main scale holding member 30 having two guide surfaces 30A and 30B corresponding to two surfaces perpendicularly intersecting each other of the main scale 10 is bondedly fixed at a predetermined pitch to the frame member 14 in its longitudinal dirction by an elastic bonding agent 32 in a state where the straightness of the guide surfaces 30A and 30B is maintained, and the main scale 10 is bondedly fixed to the main scale holding member 30 by an elastic bonding agent 34 in a state of being urged against the guide surfaces 30A of the main scale holding member 30 by rubber rods 12 as being urging means.

Figure 6:
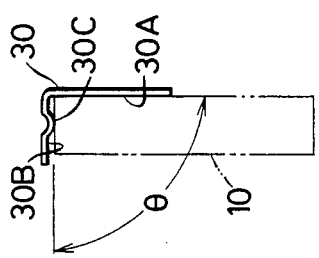
FIG. 6 is a secional view showing the configuration of the main scale holding member used in the first embodiment.

Detailedly shown in FIG. 6, the main scale holding member 30 is formed into a substantially L-shape, and a guide ridge 30C is formed at the central portion in the dirction of the thickness of the main scale on one 30B of the guide surfaces. This is intended for that, even if there is a slight error in an angle of bending of the main scale holding member 30, the bottom surface of the main scale 10 can be reliably brought into contact with the guide surface 30B. In addition, when the bending of the main scale holding member 30 may be carried out with high accuracy, this guide ridge 30C may be dispensed with.

An area of the rubber rod 12 in contact with the main scale 10 is made smaller than an area of the main scale 10 in contact with the main scale holding member 30. This is intended to prevent an unbalanced moment from being generated.

A ratio between the length 1 of the main scale holding member 30 and an interval P for providing the main scale holding member is set within the ranges from 1:7 to 1:11. This is intended for that a difference in value of thermal expansion between the main scale 10 and the frame member 14 is absorbed to prevent the main scale 10 from being damaged due to thermal stress, a hysteresis in a measured value due to a change in temperature during the measurement is reduced, and further, a trouble such as a shift in position of the main scale due to careless handling during transportation is prevented from occuring.

More specifically, as has been proposed by the applicant in U.S. patent application No. 481,788, now U.S. Pat. No. 4,492,033 when the main scale is a long one of about 1500 mm to 4500 mm for example, elastic member non-bonding portions having a pitch and length, which are determined by the material quality of the elastic bonding member and the length of the main scale 10 is provided on the main scale 10 in its longitudinal direction, whereby thermal stress applied to the main scale via the elastic bonding member at the time of a change in temperature is reduced, so that the main scale 10 can be prevented from being damaged due to the thermal stress and a hysteresis in a measured value due to a change in temperature during the measurement can be reduced. In consequence, when the main scale 10 is a long one of 1500 mm or more for example, ratio between the length 1 of the guide surface of the main scale holding member 30 and the interval P of providing the main scale holding member 30 may be set within the range from 1:15 to 1:20. On the other hand, when the maind scale 10 is a comparatively short one such for example as 1500 mm or less, the main scale is light in weight and easily conveyed, whereby the measuring device is liable to be carelessly handled during transportation. In consequence, sufficient consideration should be given to the fall-down of the package, and, for example, it is necessary to increase maximum allowable external force of about 12G in the case of a long scale, to about 20G to 50G in the case of a short scale. In consequence, in this case, the ratio between the length 1 of the guide surface of the main scale holding member 30 and the interval P for providing the main scale holding member 30 should be set within the range from 1:7 to 1:11.

With the linear scale type displacement measuring devices provided with main scales 10 having effective lengths of 1600 mm, 1800 mm, 2000 mm, 2200 mm, 2400 mm, 2600 mm, 2800 mm and 3000 mm, respectively, the inventor, conducted experiments, arranging rubber rods formed of nitrile rubber of a diameter of 3 mm (of hardness 60) at a regular pitch in such a manner that the lengths of the bonded portion are 15 plus or minus 2 mm and the lengths of the non-bonded portions are 135 mm, obtained the results of experiments as shown in Table 1, and accertained that the respective results were satisfactory.

In table 1, F ($\frac{1}{2}$) is the maximum tensile force of the main scale 10 (unit Kg: standard value 330 Kg/mm) at the time of a temperature change of 70° C., $\sigma g$ max the maximum stress of the main scale 10 (unit $Kg/mm^2$: standard value 3 $Kg/mm^2$), $\sigma r$ max the maximum stress of the rubber rod 12 (unit $Kg/mm^2$: standard value 0.8 $Kg/mm^2$), $\lambda(1)$ is a difference in value of thermal expansion between the frame member 14 and the main scale 10 (unit mm), $\lambda'(1)$ is an elongation of the main scale 10 (unit micrometer) by the tensile force of the rubber rod 12, $\lambda''(1)$ is an elongation of the rubber rod 12 (unit mm), $\lambda(h)$ is a value of hysteresis (unit micrometer) to temperature, and $\eta$ is the maximum allowable external force (unit G).

As apparent from table 1, it is found that the maximum allowable external forces 20G–50G are secured, a value of hysteresis to temperature is comparatively low, e.g. 4.4 micrometer in the case of 1600 mm, and moreover, the costs for packaging are improved to a considerable extent.

When the values of hysteresis to temperature are calculated in the same manner as described above, when the effective length of the main scale is 1000 mm, the value of hysteresis was 1.7 micrometer, when the effective length is 1200 mm, the value of hysteresis was 2.5 micrometer, and, when the effective length is 1400 mm, the value of hysteresis was 3.4 micrometer, so that all of the above values were unproblematic.

TABLE 1

| | DESIGNED TARGET VALUE | EFFECTIVE LENGTH (mm) | | | | | | | |
|---|---|---|---|---|---|---|---|---|---|
| | | 1000 | 1800 | 2000 | 2200 | 2400 | 2600 | 2800 | 3000 |
| $F(\frac{1}{2})$ | 165 Kg | 11.8 | 13.8 | 15.8 | 18.2 | 20.5 | 23.0 | 25.6 | 28.4 |
| $\delta g$max | 1.5 $Kg/mm^2$ | 0.11 | 0.13 | 0.14 | 0.17 | 0.19 | 0.21 | 0.23 | 0.26 |
| $\delta r$max | 0.4 $Kg/mm^2$ | | | 0.19 | | | | | 0.25 |
| $\lambda(1)$ | — | 1.110 | 1.300 | 1.430 | 1.560 | 1.690 | 1.820 | 1.950 | 2.080 |
| $\lambda'(1)$ | AS SMALL AS POSSIBLE | 12.4 μm | 16.2 | 20.7 | 26.0 | 32.0 | 38.9 | 46.6 | 55.3 |
| $\lambda''(1)$ | — | 1.158 mm | 1.284 | 1.409 | 1.534 | 1.658 | 1.781 | 1.903 | 2.025 |
| $\lambda(h)$ | AS SMALL AS POSSIBLE | 4.4 μm | 5.6 | 6.9 | 8.3 | 9.9 | 11.6 | 13.4 | 15.3 |
| $\eta$ | 20–50 | 20–50 | 20–50 | 20–50 | 20–50 | 20–50 | 20–50 | 20–50 | 20–50 |

Specifically speaking, the mounting of the main scale 10 to the frame member 14 is carrried out in the following manner, for example. Firstly, the main scale holding member 30 formed of the magnetic material is attractedly fixed at the predetermined pitch to the positioning jig including the magnet portions having the shapes corresponding to the two surfaces perpendicularly intersecting each other of the main scale 10, provided at least at positions corresponding to the positions, where the main scale holding member 30 is provided. Subsequently, the frame member 14 is bondedly fixed to the main scale holding member 30 attractedly fixed to the positioning jig by the elastic bonding agent 32. Further, the positioning jig is removed, and instead, the main scale 10 is bondedly fixed to the main scale holding member 30 by the elastic bonding agent 34. With this arrangement, the main scale holding member 30 can be easily bondedly fixed to the frame member 14 in a state where the straightness of the guide surfaces 30A and 30B is maintained.

Detailed description will hereunder be given of the second embodiment of the present invention.

Figure 7:
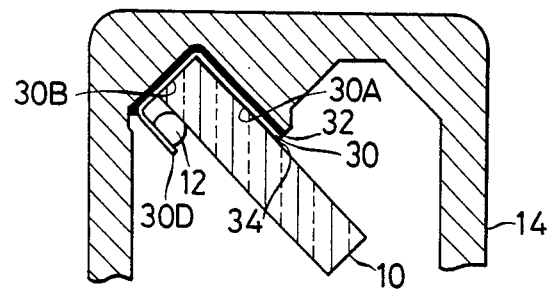
FIG. 7 is a secional view showing construction for holding the main scale in a second embodiment of the linear scale type displacement measuring device according to the present invention.

Similarly to the first embodiment, according to the second embodiment, in a linear scale type displacement measuring device comprising the main scale 10, the frame member 14, the index scale (not shown), the main scale holding member 30 and the like, the main scale holding member 30 itself is provided with a main scale engaging portion 30D as shown in FIG. 7, the substantially U-shaped main scale holding member 30 having the main scale engaging portion 30D is bondedly fixed at the predetermined pitch to the frame member 14 in its longitudinal direction by the elastic bonding agent 32 in a state where the straightness of the guide surfaces 30A and 30B is maintained, and the main scale 10 is bondedly fixed to the main scale holding member 30 by the elastic bonding agent 34 in a state where the main scale 10 is urged against the guide surface 30A of the main scale holding member 30 by the rubber rods 12 as being the urging means utilizing the main scale engaging portion 30D.

Other respects are similar to the first embodiment, so that detailed description thereof will be omitted.

In this embodiment, the urging means comprises by the rubber rods 12 inserted between the main scale engaging portion 30D of the main scale holding member 30 and the main scale 10, so that the main scale 10 can be reliably held.

Detailed description will hereunder be given of the third embodiment of the present invention.

Figure 8:
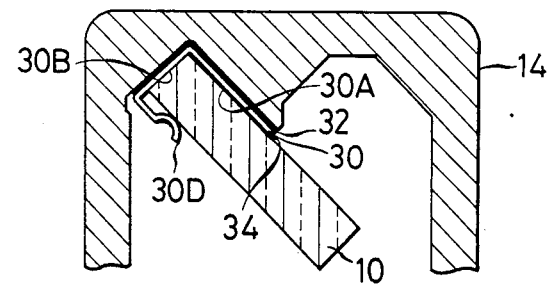
FIG. 8 is a secional view showing construction for holding the main scale in a third embodiment of the linear scale type displacement measuring machine according to the present invention.

Similarly to the second embodiment, according to the third embodiment, in a linear scale type displacement measuring device comprising the main scale 10, the frame member 14, the index scale (not shown), the main scale holding member 30 formed with the main scale engaging portion 30D and the like, the main scale engaging portion 30D of the main scale holding member 30 is provided with the spring characteristics as shown in FIG. 8, and the main scale engaging portion 30D itself having the spring characteristics urges the main scale 10 towards the guide surface 30A of the main scale holding member 30. Other respects are similar to the second embodiment, so that detailed description thereof will be omitted.

In this embodiment, the urging means is the main scale engaging portion 30D itself provided with the spring characteristics of the main scale holding member 30, so that construction is very simplified.

In all of the above embodiment, in bonding the frame member 14 to the main scale holding member 30 and also in bonding the main scale holding member 30 to the main scale 10, the elastic bonding agents 32 and 34 are used, so that the effect of absorbing the difference in value of thermal expansion between the main scale 10 and the frame member 14 is particularly high. In addition, the type of the bonding agents need not necessarily be limited to this, either one or both of the bonding agents may not have elasticity, for example.

Additionally, in all of the above embodiment, the present invention has been applied to the linear scale type displacement measuring device using the aluminum frame member and the glass main scale, however, it is evident that the scope of apllication of the present invention need not necessarily be limited to this, the invention is similarly applicable to the linear scale type displacement measuring device using the frame member and the main scale, which are formed of materials other than the above-described ones.

What is claimed is:

1. A linear scale type displacement measuring device wherein said measuring device comprises: a frame member connected to one of two bodies, a relative displacement of which is to be measured; a main scale held on said frame member and formed of a material different in coefficient of thermal expansion from said frame member: and an index scale connected to the other of said two bodies and movable along said main scale, and a relative displacement between said two bodies is to be measured from a relative movement between said main scale and said index scale, a main scale holding member having two guide surfaces corresponding to two surfaces intersecting each other of said main scale is bondedly fixed at a predetermined pitch to said frame member in its longitudinal direction in a state where the straightness of said guide surfaces are maintained, and said main scale is bondedly fixed to said main scale holding member in a state of being urged against the guide surfaces of said main scale holding member by urging means.

2. A linear scale type displacement measuring device as set forth in claim 1, wherein a guide ridge is formed at the central portion in the direction of the thickness of the main scale on the guide surface.

3. A linear scale type displacement measuring device as set forth in claim 1, wherein said urging means is formed of an elastic material and an area of said elastic material in contact with the main scale is smaller than an area of said main scale in contact with said main scale holding member.

4. A linear scale type displacement measuring device as set forth in claim 1; wherein a ratio between the length of the guide surface of said main scale holding member and an interval for providing said main scale holding member is set within the range from 1:7 to 1:11.

5. A linear scale type displacement measuring device as set forth in claim 1, wherein a ratio between the length of the guide surface of said main scale holding member and an interval for providing said main scale holding member is set within the range from 1:15 to 1:20.

6. A linear scale type displacement measuring device as set forth in claim 1, wherein an elastic bonding agent is used at least one of bonded fixations between said main scale holding member and said frame member and between said main scale and said main scale holding member.

7. A linear scale type displacement measuring device wherein said measuring device comprises: a frame member connected to one of two bodies, a relative displacement of which is to be measured; a main scale held on said frame member and formed of a material different in coefficient of thermal expansion from said frame member; and an index scale connected to the other of said two bodies and movable along said main scale, and a relative displacement between said two bodies is to be measured from a relative movement between said main scale and said index scale, a main scale holding member having two guide surfaces corresponding to two surfaces intersecting each other of said main scale is bondedly fixed at a predetermined pitch to said frame member in its longitudinal direction in a state where the straightness of said guide surfaces are maintained, and said main scale is bondedly fixed to the main scale holding member in a state of being urged against the guide surfaces of said main scale holding member by urging means utilizing a main scale engaging portion.

8. A linear scale type displacement measuring device as set forth in claim 7, wherein said urging means comprises rubber rods inserted between said main scale engaging portion of the main scale holding member and said main scale.

9. A linear scale type displacement measuring device as set forth in claim 7, wherein said urging means is the main scale engaging portion itself provided with a spring characteristics in the main scale holding member.

10. A method of mounting a main scale onto a linear scale type displacement measuring device wherein said measuring device comprises: a frame member connected to one of two bodies, a relative displacement of which is to be measured; a main scale held on said frame member and formed of a material different in coefficient of thermal expansion from said frame member; and an index scale connected to the other of said two bodies and movable along said main scale, and a relative displacement between said two bodies is to be measured from a relative movement between said main scale and said index scale, characterized in that said method comprises:

a step of attractingly fixing a main scale holding member formed of a magnetic material at a predetermined pitch to a positioning jig including magnet portions having shapes corresponding to two surfaces intersecting each other of said mian scale, the magnet portions are provided at least at positions corresponding to the positions, where the main scale holding member having two guide surfaces corresponding to two surfaces intersecting each other of said main scale are provided;

a step of bondedly fixing said frame member to said main scale holding member attractedly fixed to said positioning jig; and a step of removing said positioning jig, and instead, bondedly fixing said main scale to said main scale holding member.

* * * * *